(12) United States Patent
Hotra

(10) Patent No.: US 10,289,442 B1
(45) Date of Patent: *May 14, 2019

(54) PARALLELIZATION IN VIRTUAL MACHINE OPERATION

(71) Applicant: The Boeing Company, Chicago, IL (US)

(72) Inventor: Jonathan N. Hotra, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,155

(22) Filed: Sep. 19, 2018

Related U.S. Application Data

(63) Continuation of application No. 14/492,108, filed on Sep. 22, 2014, now Pat. No. 10,108,445.

(51) Int. Cl.
*G06F 9/455* (2018.01)
*G06F 9/50* (2006.01)
*G06F 9/48* (2006.01)

(52) U.S. Cl.
CPC ...... *G06F 9/45558* (2013.01); *G06F 9/45504* (2013.01); *G06F 9/4887* (2013.01); *G06F 9/5027* (2013.01); *G06F 9/5038* (2013.01); *G06F 2009/4557* (2013.01); *G06F 2209/508* (2013.01)

(58) Field of Classification Search
CPC ............................ G06F 9/45533; G06F 9/4843
USPC ...................................................... 718/1, 100
See application file for complete search history.

(56) References Cited

U.S. PATENT DOCUMENTS 7,475,002 B1   1/2009  Mann
7,802,073 B1 * 9/2010  Cheng ................... G06F 9/3851
                                                    712/10

(Continued)

OTHER PUBLICATIONS

Kale, "The Virtualization Approach to Parallel Programming: Runtime Optimizations and the State of the Art," Parallel Programming Laboratory, University of Illinois at Urbana-Champaign, Nov. 11, 2005, 17 pages.

(Continued)

*Primary Examiner* — Andy Ho
(74) *Attorney, Agent, or Firm* — Womble Bond Dickinson (US) LLP

(57) ABSTRACT

A method of providing virtualization services includes identifying computer programs executable as a plurality of tasks, including identifying tasks from the plurality of tasks. The method includes executing the computer programs by virtual central processing units (CPUs) in a virtual machine executed on a host hardware platform and defined to provide a virtualization platform for virtualization of a target hardware platform. This includes executing the plurality of tasks other than the identified tasks by the virtual CPUs in the virtual machine executed on CPUs of the host hardware platform, and at least partially in parallel with these tasks, executing the identified tasks on additional CPUs of the host hardware platform. The target hardware platform includes one or more CPUs for execution the plurality of tasks no greater in number than the CPUs of the host hardware platform on which the plurality of tasks other than the identified tasks are executed.

21 Claims, 12 Drawing Sheets

(56) References Cited

U.S. PATENT DOCUMENTS

| | | | |
|---|---|---|---|
| 8,752,058 B1 * | 6/2014 | Zheng | G06F 9/45533 |
| | | | 718/102 |
| 9,354,934 B2 * | 5/2016 | Accapadi | G06F 9/4812 |
| 2004/0221285 A1 | 11/2004 | Donovan et al. | |
| 2009/0112569 A1 | 4/2009 | Angus et al. | |
| 2009/0260006 A1 | 10/2009 | Hotra | |
| 2009/0300637 A1 | 12/2009 | Ringseth et al. | |
| 2012/0324447 A1 | 12/2012 | Huetter et al. | |
| 2013/0007730 A1 | 1/2013 | Hotra et al. | |
| 2013/0031543 A1 | 1/2013 | Angus | |
| 2014/0245304 A1 | 8/2014 | Zheng et al. | |

OTHER PUBLICATIONS

"Timekeeping in VMware Virtual Machines," Copyright 1998-2005, VMware White Paper, 25 pages.
"Timekeeping in VMware Virtual Machines," Copyright 2011, VMware Information Guide, 32 pages.

* cited by examiner

PARALLELIZATION IN VIRTUAL MACHINE OPERATION

CROSS-REFERENCE TO RELATED APPLICATION(S)

The present application is related to U.S. patent application Ser. No. 14/172,206, entitled: Removal of Idle Time in Virtual Machine Operation, filed on Feb. 4, 2014, and is a continuation of U.S. patent application Ser. No. 14/492,108, filed Sep. 22, 2014, entitled: Parallelization in Virtual Machine Operation, the contents of which are incorporated herein by reference in their respective entireties.

TECHNOLOGICAL FIELD

The present disclosure relates generally to virtualization of hardware and, in particular, to parallelization in a virtual machine or virtualization platform provided thereby.

BACKGROUND

Many modern complex systems including aircraft, spacecraft, automobiles, medical devices and the like involve a central computer system or other processing element that communicates with a number of subsystems to create a complete system. This central processing element may include one or more processors and/or cores that execute computer programs designed to control the complex system.

To develop these complex systems, test facilities are created that allow for computer programs in the central computer system to be developed and tested with real and/or simulated subsystems attached to the test facilities. Since these test facilities are often expensive, they are typically a limited resource on a development program. To create more test capabilities, virtual representations of the test facilities are often created.

One way to create a virtual test facility is to create simulations of appropriate devices and communication interfaces and attach these simulations to computer programs for control of the complex system that run inside a virtualization platform, which may be provided by a suitable virtual machine configured to run on top of a host hardware platform. It is often desirable to run computer programs on an emulated processor inside the virtual platform. The emulated processor and virtualization layer allows for great control of the execution of the computer programs, and it also provides greater visibility into the operation of the computer programs.

After a complex system is developed, it is often necessary or highly desirable to create a trainer to train the users of the complex system on its operation. It is highly desirable to have a trainer that operates in a fashion as close to, if not identical, to the operation of the actual system. One method to create a trainer is to run computer programs inside a virtualization platform on a host hardware platform. It is often desirable to run the computer programs on an emulated processor inside the virtual platform. The emulated processor and virtualization layer provides a high fidelity representation of the actual system and allows for great control of the execution of the computer programs to allow for the creation of certain training scenarios that would not be possible on the actual target hardware platform used in the complex system.

The creation of a virtualization platform involves the creation of a pure software representation of the target hardware platform found on the actual complex system. The objective of the virtualization is to make the computer programs running inside the virtual platform to execute in a similar fashion as the real target hardware. To accomplish this goal, the hardware found in the memory map of a system that is accessed by the computer programs running on the virtual platform may be virtualized. This virtualization of the hardware varies in complexity, but if done correctly when computer programs read/write to memory locations and registers, it should see the behavior it expects in the system.

Another aspect of creating a virtualization platform is the correct handling of interrupts in a system. The interrupts are used to signal events in a system, such as input/output transmission and/or reception, timer expiration and the like. The design of the interrupts varies between systems. Interrupt designs often use interrupt lines, vectors and controllers to attach the interrupts to devices in a system. All of the functionality of the interrupt design may be virtualized to achieve an effective virtual platform.

Emulation of a processor is often a desirable feature in a virtualization platform. The processor emulation allows for the exact same binaries of the computer programs that execute on the hardware to execute in the virtualization platform. It is also possible to use the exact same software development environment and operating systems if processor emulation is available on the virtualization platform.

Emulation of a processor is slower than native processor execution. It is often desirable in test facilities and trainers that use virtualization platforms to run at least as fast as the target hardware platform being virtualized, and it is often desirable to run accelerated (faster than the target hardware platform). Since the host hardware platform that runs the virtualization platform is typically much faster than the target hardware platform, the necessary performance can sometimes be achieved without additional work. But as the performance gap closes between the target and host hardware platforms, it may be difficult if not impossible to achieve the desired emulation performance using traditional techniques.

BRIEF SUMMARY

In view of the foregoing background, example implementations of the present disclosure provide a computer system, method and computer-readable storage medium for providing virtualization services, and including parallelization in a virtual machine or virtualization platform provided thereby. In this regard, example implementations may include identifying tasks or processes in a system, and detecting their execution in the virtualization layer that may operate a virtual machine with one or more virtual processors. Their processing may then be sent off to additional physical central processing units (CPUs) (sometimes referred to as "cores") of the host hardware platform. Computer programs in the virtual machine may not see any additional virtual processors and may not have to be written to run on multiple processors.

According to one aspect, a method of providing virtualization services may include identifying one or more computer programs executable as a plurality of tasks, including identifying one or more tasks from the plurality of tasks. The method may also include executing the computer program(s) by one or more CPUs in a virtual machine executed on a host hardware platform and defined to provide a virtualization platform for virtualization of a target hardware platform. Executing the computer program(s) may include executing the plurality of tasks other than the identified task(s) by the virtual CPU(s) in the virtual machine executed on one or more CPUs of the host hardware platform. And executing the computer program(s) may include executing the identified task(s) on one or more additional CPUs of the host hardware platform, such that the identified task(s) are executed by the additional CPU(s) of the host hardware platform at least partially in parallel execution of with the plurality of tasks other than the identified task(s) by the virtual CPU(s) in the virtual machine. According to this aspect, the target hardware platform may include one or more CPUs for execution the plurality of tasks no greater in number than the CPU(s) of the host hardware platform on which the plurality of tasks other than the identified task(s) are executed.

In some examples, identifying the identified task(s) may include analyzing one or more symbol tables of the computer program(s) to identify the identified task(s).

In some examples, the plurality of tasks may include one or more foreground tasks and one or more background tasks. In these examples, identifying the identified task(s) may include identifying the background identified task(s).

In some examples, the plurality of tasks may be scheduled for execution at respective points in time. In these examples, the identified task(s) may be executed on the additional CPU(s) before the respective points in time at which the identified task(s) are scheduled for execution. And in some further examples, executing the plurality of tasks other than the identified task(s) may include executing a method stub by the virtual CPU(s), or immediately moving to a next-scheduled task of the plurality of tasks for execution by the virtual CPU(s), at each of the respective points in time at which the identified task(s) are scheduled for execution.

In some examples, executing the identified task(s) may include executing the identified task(s) by one or more additional virtual CPUs in the virtual machine executed on the additional CPU(s) of the host hardware platform, with the additional virtual CPU(s) being hidden from an operating system configured to manage the virtualization platform.

In some examples, the plurality of tasks may be scheduled for execution at respective points in an apparent time tracked by an apparent-time reference. In these examples and during execution of the plurality of tasks other than the identified task(s), the method may further include detecting a current point in apparent time at which all foreground tasks of the plurality of tasks other than the identified task(s) have been executed, or at which the virtual CPU(s) are idle. And in response thereto, the method may include advancing the apparent time from the current point to a subsequent point with a frequency greater than that with which the apparent time is tracked by the apparent-time reference.

In other aspects of example implementations, a computer system and computer-readable storage medium are provided for parallelization in virtual machine operation. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1A:
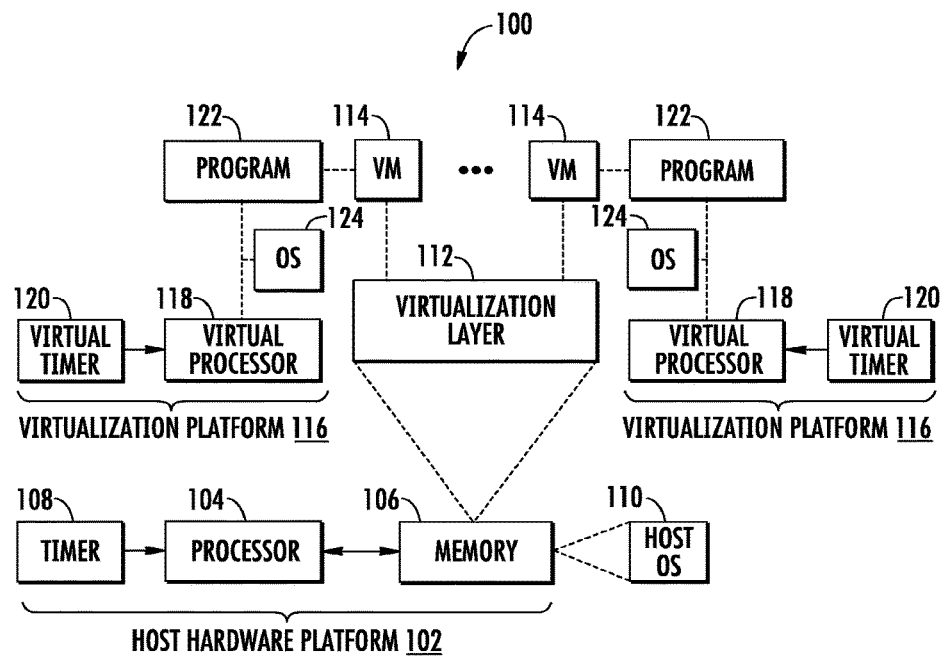
FIGS. 1A, 1B and 1C (collectively FIG. 1) illustrate a computer system in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Figure 1B:
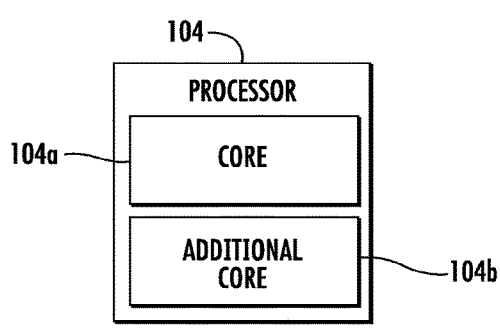
Figure 1C:
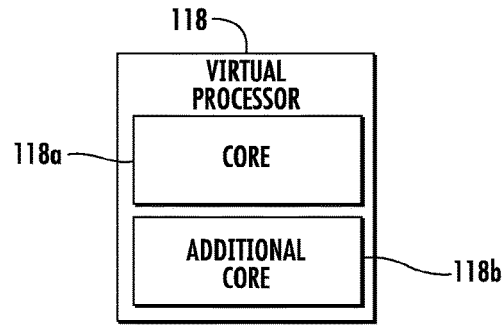

Example implementations of the present disclosure are directed to parallelization in operation of a virtual machine on a host hardware platform. Example implementations of the present disclosure may be implemented by various means including hardware, alone or under direction of one or more computer program code instructions, program instructions or executable computer-readable program code instructions (at times generally referred to as "computer programs," "software," "firmware" or the like) from a computer-readable storage medium. FIGS. 1A, 1B and 1C (collectively FIG. 1) illustrate a computer system 100 that may be configured to implement various example implementations of the present disclosure.

The computer system 100 may comprise, include or be embodied in one or more fixed or portable electronic devices. Examples of suitable electronic devices include a smartphone, tablet computer, laptop computer, desktop computer, workstation computer, server computer or the like. As shown, the computer system may include a host hardware platform 102 with one or more of each of a number of components such as, for example, a processor 104 (e.g., processor unit) connected to a memory 106 (e.g., memory device, persistent storage).

The processor 104 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another computer system or apparatus).

The processor 104 may be a number of single-core processors, a multi-core processor (sometimes referred to as a multi-processor core) or some other type of processor, depending on the particular implementation. Various examples of suitable multi-core processors include eight, twenty-four, fifty cores or more. As shown in FIG. 1B, the processor may be composed of a number of central processing units (CPU) (often referred to as "cores"), including one or more cores 104a and one or more additional cores 104b. Further, the processor may be implemented using a number of heterogeneous processor systems in which a main core is present with one or more secondary cores on a single chip. As another illustrative example, the processor may be a symmetric multi-core processor system containing multiple cores of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 106 is generally any piece of computer hardware that is capable of storing information such as, for example, data, computer programs (e.g., computer-readable program code) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

The computer system 100 may also include or otherwise support one or more time references configured to measure time intervals or otherwise track time. As shown and primarily described herein, one example of a suitable time reference is a timer 108.

It should be understood, however, that the computer system may additionally or alternatively include other suitable types of time references, and that example implementations may be equally applicable to these other types of time references. Examples of other suitable time references include processor counters such as time stamp counters (TSCs), timebase counters, incrementing and/or decrementing counters, and the like.

In some examples, a time reference such as a timer 108 may be configured to measure the passage of time such as by tick counting or tickless timekeeping. In accordance with tick counting, the timer may be configured to periodically generate a timer interrupt (also known as a "tick") at a known rate such as 100 times per second. Tickless timekeeping may include the timer being configured to keep a count of a number of time units that have passed since some event such as the computer system 100 boot. Even further, in some examples, the timer may be configured to track real time, also known as "wall-clock time." Examples of suitable timers include programmable interval timers (PITs), real-time clocks (RTCs), local advanced programmable interrupt controller (APIC) timers, advanced configuration and power interface (ACPI) or chipset timers, time stamp counters (TSCs), high-precision even timers (HPETs) or the like.

The memory 106 may store computer programs or software that, when loaded into and executed by the processor 104, cause the computer system 100 or more particularly its host hardware platform 102 to provide virtualization services. This software may include, for example, a host operating system (OS) 110 configured to manage the host hardware platform. In addition, this software may include a virtualization layer 112 configured to serve as a software layer above the host hardware platform. The virtualization layer may be integrated within or run on top of the host OS. The virtualization layer may operate one or more virtual machines (Vets) 114.

The term "virtualization" as used herein may refer to techniques for hiding or separating the details or physical characteristics of computing resources from the way in which other systems, applications, or end users interact with those resources. Different aspects of virtualization may include presenting a single physical resource as multiple logical resources. Other aspects of virtualization may include presenting multiple physical resources as a single logical resource.

Each VM 114 may be defined to provide a virtualization platform 116 for virtualization of a target hardware platform. The term "virtualization platform" is typically associated with an embedded system, but such platforms are really just a type of the more general term virtual machine. Both virtual platforms and virtual machines are virtual representations of hardware.

The virtualization platform 116 may include one or more of each of a number of virtual components such as, for example, a virtual processor 118 and an apparent-time reference. The virtual processor may be configured to virtualize a processor of the target hardware platform. Similar to the processor 104 of the computer system 100, the virtual processor may be composed of one or more virtual cores (CPUs) 118a and one or more additional virtual cores 118b, as shown in FIG. 1C. Likewise, the processor of the target hardware platform may be composed of one or more cores, although perhaps fewer in number than the core(s) 104a of the processor 104 of the computer system 100.

The apparent-time reference may be configured to virtualize a corresponding time reference (e.g., timer) of the target hardware platform. As shown and primarily described herein, one example of a suitable apparent-time reference is a virtual timer 120, although it should be understood that the virtualization platform may additionally or alternatively include (and example implementations may be equally applicable to) other suitable types of apparent-time references, similar to the above with respect to the timer 108 of the computer system 100.

As also shown, the virtual processor 118 may be configured to execute one or more computer programs 122, such as in an OS 124. Similar to the host OS 110 running on the host hardware platform 102, the OS running on the VM 114 may be configured to manage the virtualization platform 116, which again is configured to virtualize the target hardware platform.

The target hardware platform (including its processor and timer) virtualized by the virtualization platform 116 (including its virtual processor 118 and timer 120) may be the same or different from the host hardware platform 102 (including its processor 104 and timer 108). Similarly, the OS 124 running on the VM 114 may be the same or different from the host OS 110. In instances in which the target and host hardware platforms differ, the virtualization platform may be configured to emulate the target hardware platform. More specifically, in these instances, the virtual processor and timer of the virtualization platform may be configured to emulate those of the target hardware platform. For example, the virtual processor may be configured to execute computer programs 122 through emulation of the processor of the target hardware platform.

An apparent-time reference such as a virtual timer 120 may be configured to virtualize or otherwise emulate a corresponding time reference (e.g., timer) of the target hardware platform. Whereas timers of hardware platforms such as the timer 108 of the host hardware platform may track real (or wall-clock) time, though, the virtual timer may track an apparent time (sometimes called virtual time but not to be confused with logical time). This apparent time represents the time visible to the VM 114. The virtual timer 120 may track apparent time similar to the timer of the host hardware platform, but the virtual timer's frequency is not dependent on that of the timer of the host hardware platform. Thus, the apparent time tracked by the virtual timer need not exactly follow real time. And in some examples, apparent time may be controlled to advance forward or backward, faster or slower, or even stop.

In accordance with example implementations of the present disclosure, the computer programs 122 may be executed by the virtual processor 118 as tasks scheduled for execution at respective points in an apparent time tracked by an apparent time reference (e.g., virtual timer 120). In some examples, the virtualization platform 116 may virtualize a frame-based system in which the tasks may be executed during a cycle or multiple, repeatable cycles in which the tasks are scheduled for execution. As described herein, a "task" generally refers to a unit of execution, and may include a task, thread, process, fiber or the like.

Figure 2:
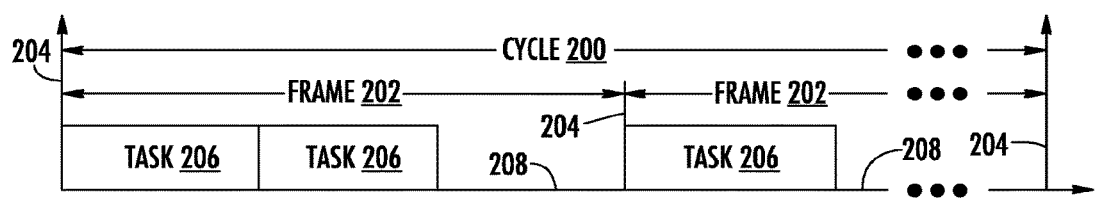
FIG. 2 illustrates a cycle including frames in which tasks may be executed in a virtual machine, according to some example implementations of the present disclosure.

FIG. 2 illustrates a cycle 200 according to some examples. As shown, a cycle may be divided into a plurality of minor cycles often referred to as frames 202 (or sometimes minor frames). The frames may have boundaries 204 defined at respective points in apparent time tracked by an apparent-time reference (e.g., virtual timer 120) of the virtualization platform 116. Although shown and described herein in the context of a frame-based system, it should be understood that example implementations may equally apply to non-frame-based systems, such as those that are purely event-driven.

As also shown in FIG. 2, each of at least some of the tasks 206 of the computer programs may be scheduled in one or more of these frames. The tasks shown may include those scheduled for repeated execution at a given frequency. These tasks are sometimes referred to as foreground tasks, and often include higher-priority tasks. In the context of a complex system such as an aircraft, foreground tasks may include those that ensure control of the aircraft. The time between these tasks during any particular frame is sometimes referred to as the background 208. Other tasks may be executed in the background, or at times the virtual processor 118 may be idle (sometimes represented by an idle state or idle task of the virtual processor). Tasks executed in the background (sometimes referred to as background tasks) often include lower-priority tasks, such as those used for application software and OS housekeeping functionality (e.g., updating flash memory). Some more particular example of a task executed in the background may be the aforementioned idle task representing an idle virtual processor, or a spin loop that may be used to simply generate an arbitrary time delay. In the context of a complex system, these background tasks often do not include those that are critical to control of the complex system.

A computer program 122 may be designed for a given target hardware platform that may or may not contain multiple cores. Consider for example, computer programs designed for a target hardware platform with a single-core processor. These computer programs may still be include multiple tasks, processes, threads or the like. These multiple tasks may be used because computer programs often stall when waiting for a resource to become available and/or for human interaction to occur. In instances of a single thread of execution, the target hardware platform may stall waiting for an appropriate event even when other useful work could occur. Even though a computer program may be executed as multiple tasks, a single-core processor may only be able to execute one task at a time.

In another example, a computer program 122 may be designed with multiple tasks with task preemption, where certain tasks may have higher priority over other tasks. These higher priority tasks may preempt lower priority tasks in order to perform tasks critical to the successful operation of the target hardware platform. Again even though there are multiple tasks, a single-core processor may only be able to execute one task at a time. A single-core processor may therefore be incapable of achieving parallel execution across multiple cores.

Consider now the case of a computer program 122 designed for a single-core processor running on a VM 114. In instances in which the VM replicates the target hardware platform, it too may only have a virtual single-core processor. However, virtualization does not have the same limitations of physical hardware. Virtualization brings the possibility of achieving a new kind of parallelization that is not possible in non-virtualized target hardware platforms. As indicated above and described more fully below, then, example implementations of the present disclosure are directed to parallelization in virtual machine operation.

Returning to FIG. 1 and with additional reference to FIG. 2, in accordance with example implementations of the present disclosure, the virtualization layer 112 may identify one or more computer programs 122 executable as a plurality of tasks 206, and may identify one or more tasks from the plurality of tasks. For this, the virtualization layer may analyze one or more symbol tables of the one or more computer programs to identify tasks that may be parallelized. The virtualization layer may then cause execution of tasks other than the identified tasks by the virtual core 118a in the VM 114 executed on the core 104a of the computer system 100. In some examples, the analysis of those tasks that may be executed in parallel may be manually performed by a user, and identified to the virtualization layer.

At least partially in parallel with the execution of tasks on the core 104a, the virtualization layer may cause execution of the identified tasks on the additional core 104b of the computer system 100. This parallelization may achieve a performance improvement for computer programs 122 running inside the VM 114. In some examples, the identified tasks may be executed by the additional virtual core 118b in the VM executed on the additional core 104b of the computer system. In these examples, though, the additional virtual core may be known to the virtualization layer but hidden from the OS 124 running on the VM.

The virtualization layer 112 may cause execution of the identified tasks before the respective points in time at which the identified tasks are executed. In this regard, the OS 124 or more particularly its scheduler running on the VM 114 may schedule tasks for execution of the tasks by the virtual core 118a like it normally would, with this being the normal main thread of execution. And when a task was encountered that was already parallelized in the virtualization layer, it may have already been executed in parallel with the main thread of execution, and therefore need not be executed at its scheduled point in time. In some examples, a method stub may be executed by the virtual core at each of the respective points in time at which the identified tasks are scheduled for execution. Or in some examples, execution of the tasks may immediately move to a next-scheduled task for execution by the virtual core.

The task(s) that may be parallelized may be identified in any of a number of different manners. In some examples in which the tasks of the computer program 122 includes foreground tasks and background tasks, the virtualization layer 112 may identify one or more of the background tasks for execution on the additional core 104b of the host hardware platform 102, at least partially in parallel with one or more of the foreground tasks on the core 104a of the host hardware platform.

In some examples, even in instances in which a computer program 122 is designed to run on a target hardware platform with a single-core processor, various tasks may be run in parallel such as in instances in which the tasks are designed with task preemption. In these examples, lower priority tasks and the background task may be preempted by a higher priority task at any time. Since this is the case, it may be possible to move some or all of these tasks to underlying additional cores 104b of the host hardware platform 102. The virtualization layer 112 in these examples may analyze dependencies between the tasks to determine which tasks may be run in parallel with one another, or again this analysis may be manually performed by a user and the tasks identified to the virtualization layer. In a foreground/background based design, the background tasks may often be run in parallel to the foreground tasks.

In accordance with a further aspect of example implementations of the present disclosure, during execution of tasks 206 other than the identified tasks by the core 118a of the virtual processor 118, the VM 114 one of its components (e.g., the virtual processor) may detect a current point in apparent time during any particular frame 202 at which all tasks scheduled for repeated execution at a given frequency (foreground tasks) have been executed, or at which the virtual processor is idle (e.g., in the background 208). And in response, the apparent time tracked by virtual timer 120 may be advanced from the current point to a subsequent point with a frequency greater than that with which the apparent time is tracked by the virtual timer. In some examples, the virtual timer may itself advance apparent time. In other examples, the VM or one or more of its other components may cause the virtual timer to advance apparent time. Further information regarding this further aspect are provided below and in the above-cited and incorporated '206 application.

Figure 3:
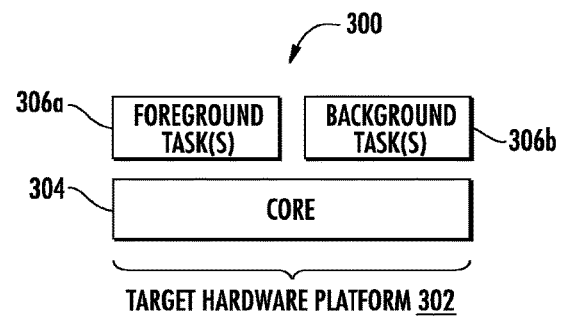
FIGS. 3, 4 and 5 illustrate a target system and computer systems for providing virtualization services for the target system without and with the parallelization of example implementations of the present disclosure.
Figure 4:
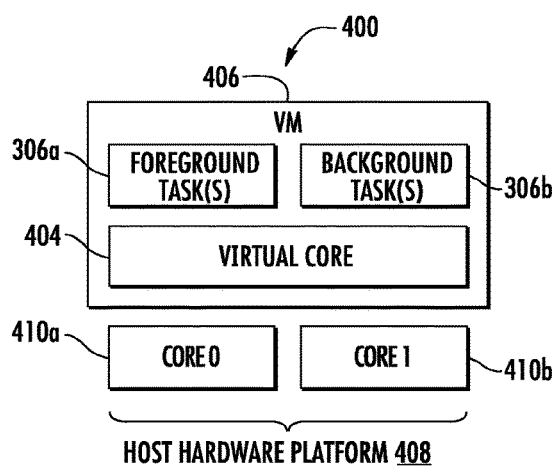
Figure 5:
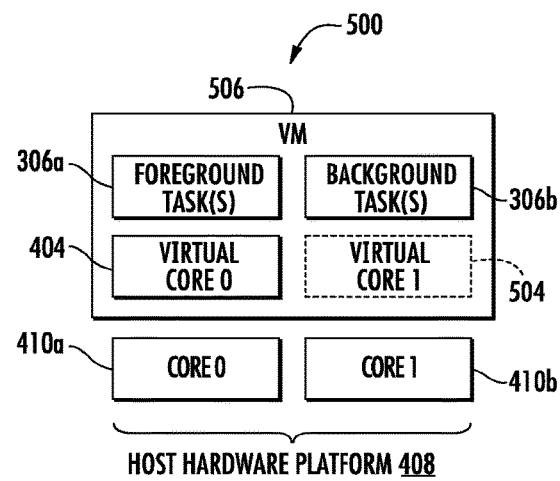

FIGS. 3, 4 and 5 illustrate a target system 300 including a target hardware platform 302, and computer systems 400, 500 for providing virtualization services for the target system without and with the parallelization of example implementations of the present disclosure. As shown in FIG. 3, the target hardware platform may include a processor composed of a single core 304 configured to execute one or more computer programs as foreground task(s) 306a and background task(s) 306b. The core may be configured to execute the computer program in an OS or in some examples without an OS, so-called bare metal. In the target system, the foreground task(s) may execute in each frame followed by the background task(s) until the next frame is ready to start.

In FIGS. 4 and 5, the computer systems 400, 500 may be configured to virtualize the target hardware platform 302 of the target system 300, and execute the computer program(s) and its foreground task(s) 306a and background task(s) 306b in an appropriate VM. As shown in FIG. 4, a single virtual core 404 may be provided by a VM 406 to virtualize the single core 304 of the target hardware platform. The VM may operate on top of a host hardware platform 408 that includes one or more processors composed of multiple cores, two of which are shown as core 0 410a and core 1 410b (although more than two cores are possible). The VM may be executed on any of the cores of the host hardware platform, or in some examples it may be locked down to a particular core such as in a manner that utilizes affinities.

The computer system 500 of FIG. 5 is similar to the computer system 400 of FIG. 4, but in which the foreground task(s) 306a and background task(s) 306b may be executed at least partially in parallel, in accordance with example implementations of the present disclosure. In FIG. 5, the single virtual core 404 (shown as virtual core 0) may be provided with an additional virtual core 504 (shown as virtual core 1) by a VM 506.

Similar to in FIG. 4, the virtual core 0 404 may be provided to virtualize the single core 304 of the target hardware platform 302, but may more particularly execute the foreground task(s) 306a. The other, virtual core 1 504 may be provided to execute the background task(s) 306b at least partially in parallel with the foreground task(s). Although this virtual core 1 may operate in the same VM 506 as the virtual core 0, it may be hidden from the OS running on the VM. The virtualization layer may be aware of the virtual core 1, and the virtual core 1 may be scheduled to run on additional underlying core(s) 410a, 410b of the host hardware platform 408. It is also possible that the virtual core 1 may be locked to additional core(s) using affinities.

In some examples, parallelization may be accomplished by identifying the background task(s) 306b in the computer program's symbol table. Execution of the foreground task(s) 306a may start on the virtual core 0 404, and execution of the background task(s) may start on the virtual core 1 504. When the virtual core 0 encounters the start of execution of the background task(s) after execution of the foreground task(s) is complete, the virtual core 0 may execute a method stub or immediately return control to the foreground task(s). This may allow the foreground and background processes to run in parallel.

Figure 6:
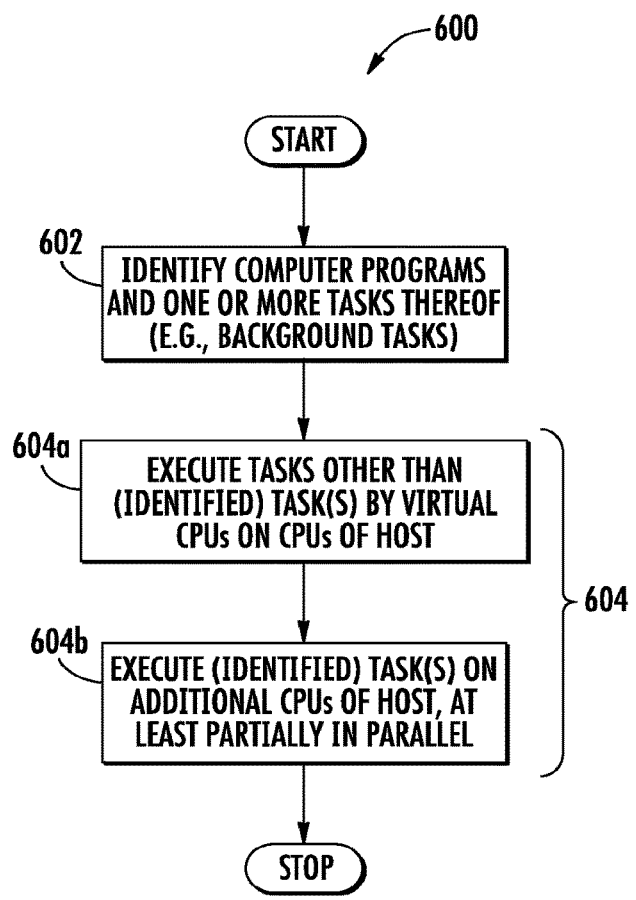
FIG. 6 illustrates a flowchart including various steps in a method of providing virtualization services, according to an example implementation of the present disclosure.

FIG. 6 illustrates a method 600 of providing virtualization services according to example implementations of the present disclosure. As shown at block 602, the method may include identifying one or more computer programs executable as a plurality of tasks, including identifying one or more tasks from the plurality of tasks. As shown at 604, the method may also include executing the computer program(s) by one or more virtual central processing units (CPUs) in a virtual machine executed on a host hardware platform and defined to provide a virtualization platform for virtualization of a target hardware platform. As shown at block 604a, executing the computer program(s) may include executing the plurality of tasks other than the (identified) task(s) by the virtual CPU(s) in the virtual machine executed on one or more CPUs of the host hardware platform. And executing the computer program(s) may include executing the task(s) on one or more additional CPUs of the host hardware platform, with the task(s) being executed at least partially in parallel with the plurality of tasks other than the task(s), as shown at block 604*b*. As explained above, the target hardware platform may include one or more CPUs for execution the plurality of tasks no greater in number than the CPU(s) of the host hardware platform on which the plurality of tasks other than the task(s) are executed.

To further illustrate how example implementations may provide performance gains for a VM 114, consider the examples shown in FIGS. 7-14. In these examples, the computer programs 122 executed in the VM may include seven foreground tasks scheduled to execute a various rates, as well as one or more background tasks. These foreground tasks in order of scheduling priority may include the following: Task64 Hz (highest priority), Task32 Hz, Task16 Hz, Task8 Hz, Task4 Hz, Task2 Hz and Task1 Hz (lowest priority). In this design, the priorities and OS task preemption may be used to achieve the desired sequence of activities for the programs, and a timer interrupt may start each frame at a 64 Hz rate.

Figure 7:
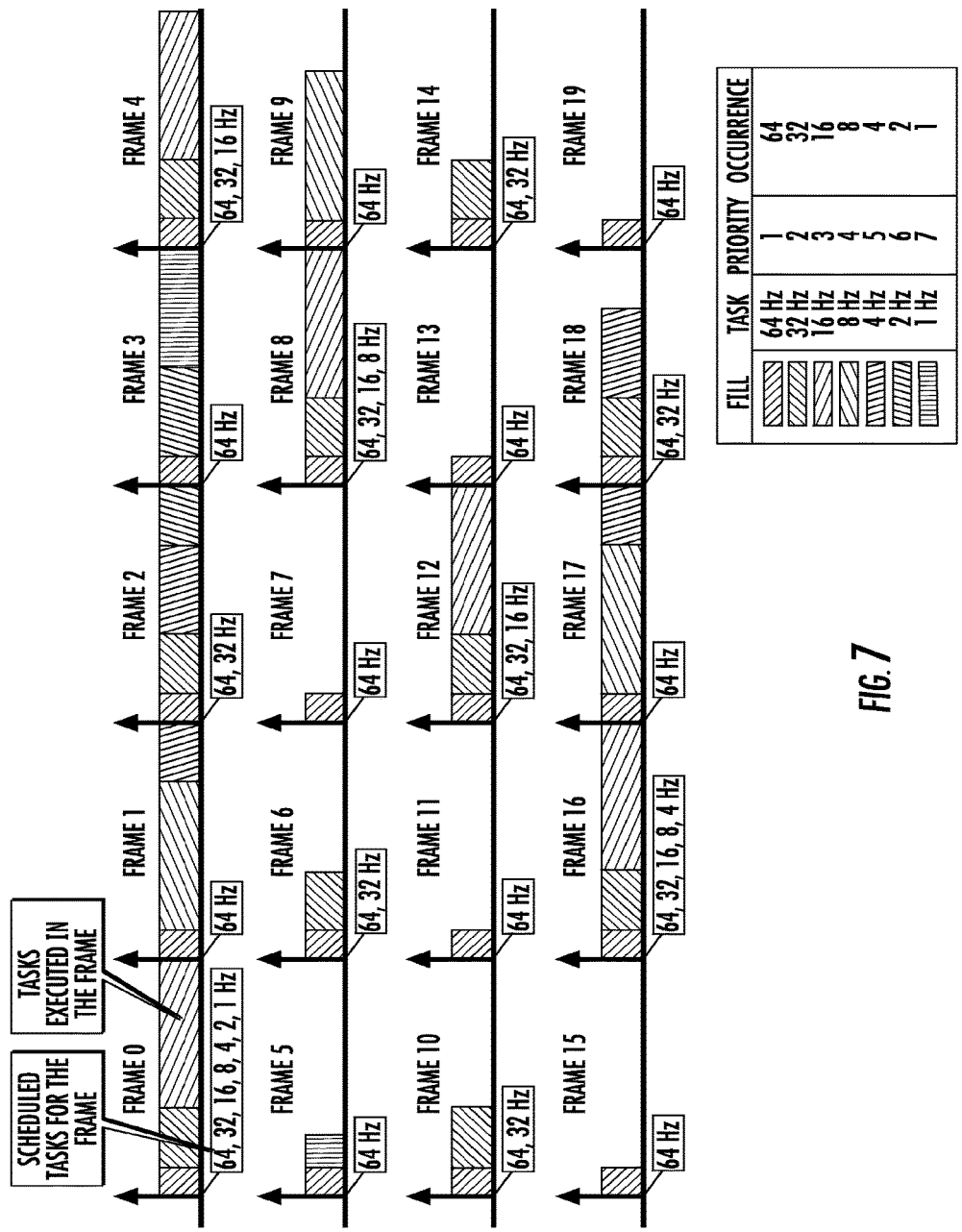
FIGS. 7-14 illustrate computer programs including tasks that may be executed, and how idle time may be removed during their execution, according to example implementations of the present disclosure.

In these examples, all tasks may be scheduled to execute in the first frame (frame 0). Through task preemption, each frame may include the highest-priority task (Task64 Hz), alone or in combination with lower-priority foreground tasks and/or background tasks. FIG. 7 illustrates execution of the tasks on the target hardware platform, which may be virtualized by the virtualization platform 116 on the VM 114. FIG. 7 and others in the examples of FIGS. 7-14 may illustrate the foreground tasks, and illustrate the background albeit without separately illustrating the tasks executed in the background (background tasks)—see, e.g., FIG. 2.

Figure 8:
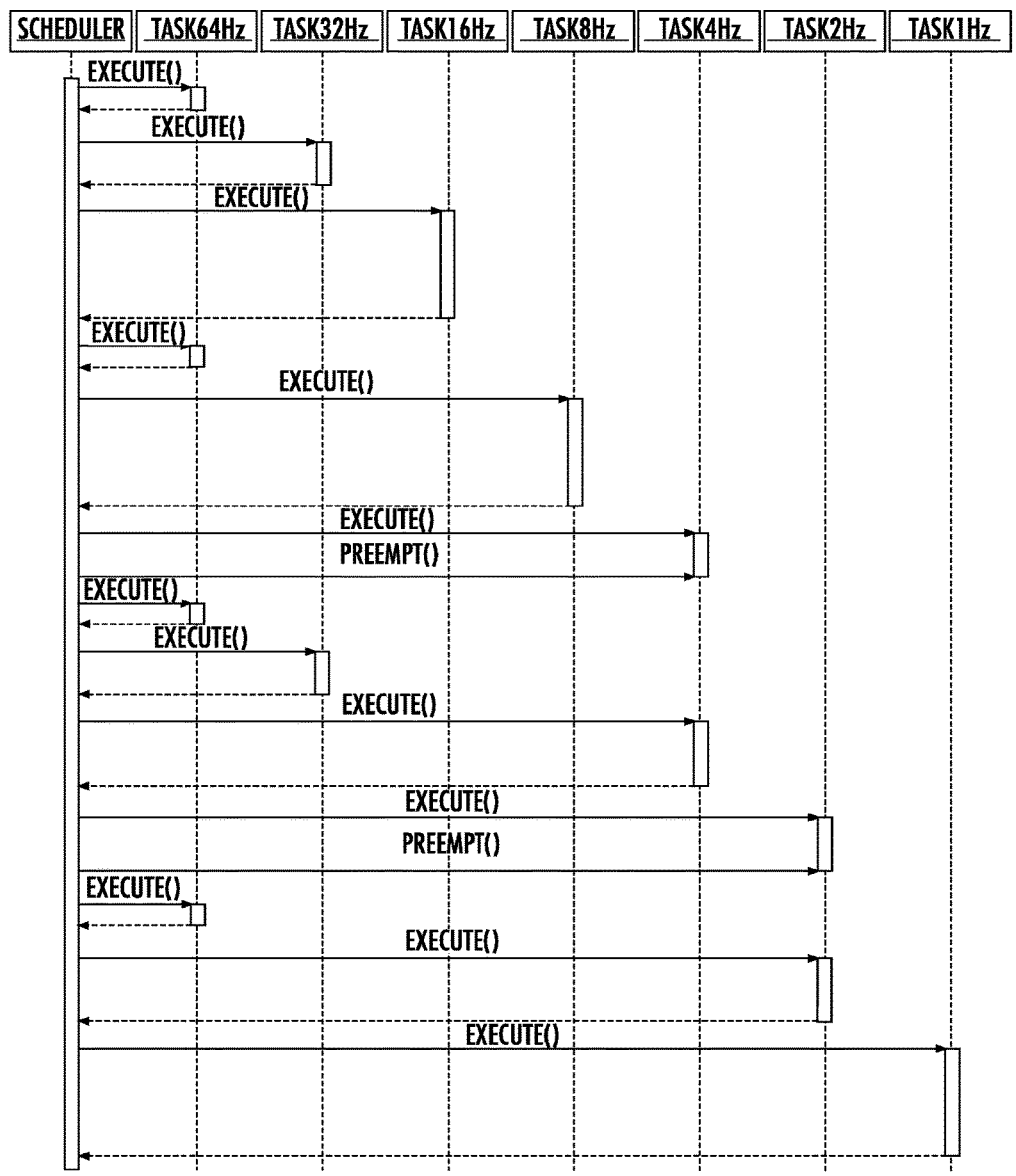

FIG. 8 illustrates a unified modeling language (UML) sequence diagram that corresponds to FIG. 7. In the UML sequence diagram, Execute( ) and Preempt( ) may represent "calls." The OS or more particularly its scheduler does not typically communicate to other tasks with these Execute( ) and Preempt( ) calls. In a typical system, a timer 108 or other suitable time reference may be used to cause an interrupt to occur. In this example, the timer may be configured to interrupt 64 times per second to allow Task64 Hz to execute at a 64 Hz rate. In some examples, an interrupt handler or interrupt service routine (ISR) may be used to release an OS object such as a semaphore to allow the proper task(s) to execute. In other examples, the ISR may release a semaphore to the highest-priority task (Task64 Hz) that executes in every frame, and this task may determine the proper task(s) to release an OS object to allow their execution. The tasks may all be active and pending on an OS object and may not execute until the task receives the OS object.

It may therefore be seen that although there may be an OS scheduler that controls task execution, it may actually be the ISR or highest-priority task that releases tasks for execution. The OS scheduler may not have an impact when there are multiple tasks of different priorities ready to execute. In these instances, the lower-priority task may not execute until all higher-priority tasks have completed their execution, and the lower-priority task may be preempted in order to allow a higher-priority task to execute. It may also be noted that the interrupt may stop execution of a current task and allow the ISR to execute, which may be how the system may regain control to determine those tasks to execute even in instances in which the system only includes a single-core processor to execute instructions.

One example of a common design for determining a task to execute at an interrupt includes use of a frame count that increments every frame, which in the illustrated examples may occur at a 64 Hz rate. To calculate the task that may require an OS object to be released, a modulus operation may be performed on the frame count. In this example, frame count modulus 64 may determine the task to execute. From the results of the modulus operation, 0 may indicate that Task1 Hz is ready to execute; 0, 31 may indicate that Task2 Hz is ready to execute; 0, 15, 31, 47 may indicates that Task4 Hz is ready to execute; 0, 7, 15, 23, 31, 39, 47, 55 may indicates that Task8 Hz is ready to execute; and so on.

The above discussion has centered on the case of computer programs designed for a target system including a single-core processor. In instances in which the target system includes multi-core processor or otherwise includes multiple cores, the scheduling of tasks may become more complex when deterministic behavior is desired. A symmetric multi-core processor (SMP) OS design may schedule tasks on any available core, so in instances in which a given task should always execute before other tasks, the OS objects may again be used to control execution behavior between the tasks. In instances in which all tasks have the same priority, they may most likely be executed in any order and in parallel with one another.

FIGS. 9-14 now illustrate example implementations in which the tasks may be virtualized by the virtualization platform 116 on the VM 114, in accordance with various example implementations of the present disclosure. As indicated above and described below, these examples may be for the case of computer programs 122 designed for a target system including a single-core processor. It should be understood, however, that the examples may be extended to computer programs designed for multiple core environments. In fact, the analysis that may be used to identify the tasks that may be parallelized may have already been completed for a multiple core environment. The parallelization in the virtualization layer 112 according to example implementations may once again provide more parallelization for a multiple core environment, because more cores of the host hardware platform 102 may be used than are available on the actual target hardware platform. The case of a single core target hardware platform is provided herein simply for ease of illustration and without loss of generality of example implementations of the present disclosure.

In some examples, one or more VMs 114 may be created that match the target system and execute on a host hardware platform including a processor (one or more) with multiple cores (CPUs). The virtual processor 118 in the VM may be emulated or the same as the processor 104 of the host hardware platform 102. One or more computer programs 122 of the target hardware platform may be executed inside the VM. To improve performance of the execution of the computer programs inside the VM, tasks may be identified that could be run in parallel and still achieve proper operation for the system. In some examples, background tasks may be executed in parallel with foreground tasks. For the multiple foreground tasks depicted in FIG. 7, it may take more effort to identify tasks that can be run in parallel. If tasks are of equal priority, it may be the case that the tasks can be run in parallel with the system still performing properly. Also, in a preemptive multitasking system such as that shown in FIG. 7, it may be the case that lower-priority tasks can run in parallel to other tasks, because these lower-priority tasks may be preempted at any time by higher-priority tasks (a form of parallel execution), and the lower-priority tasks may be tolerant to running in parallel with higher-priority tasks.

In the examples illustrated in FIGS. 9-14, the tasks Task32 Hz, Task16 Hz, and Task1 Hz may have been identified as tasks that can run in parallel. Once the tasks for parallel execution have been identified, for each identified task, one or more symbol table for the computer programs 122 executable(s) may be parsed for the symbol name of the task's function's entry point, and the instruction pointer for that task may be identified. Depending on the nature of the task's functionality, additional stub code may be created to handle basic control functionality for the task, but this may not be necessary in many examples.

At system startup in the VM 114, the tasks identified for parallel execution (Task32 Hz, Task16 Hz and Task1 Hz) may be started on additional cores 104*b* of the processor 104 of the host hardware platform, separate from the core 104*a* on which the other tasks may be executed. In FIGS. 9-14, a separate one of the additional cores may execute each of the identified tasks, although in some parallelization schedules it may not be necessary to dedicate an additional core per task running in parallel. In these examples, a core 0 may be used for tasks other than the identified tasks, and three additional cores 1, 2 and 3 may be used for the identified tasks executed in parallel.

Figure 9:
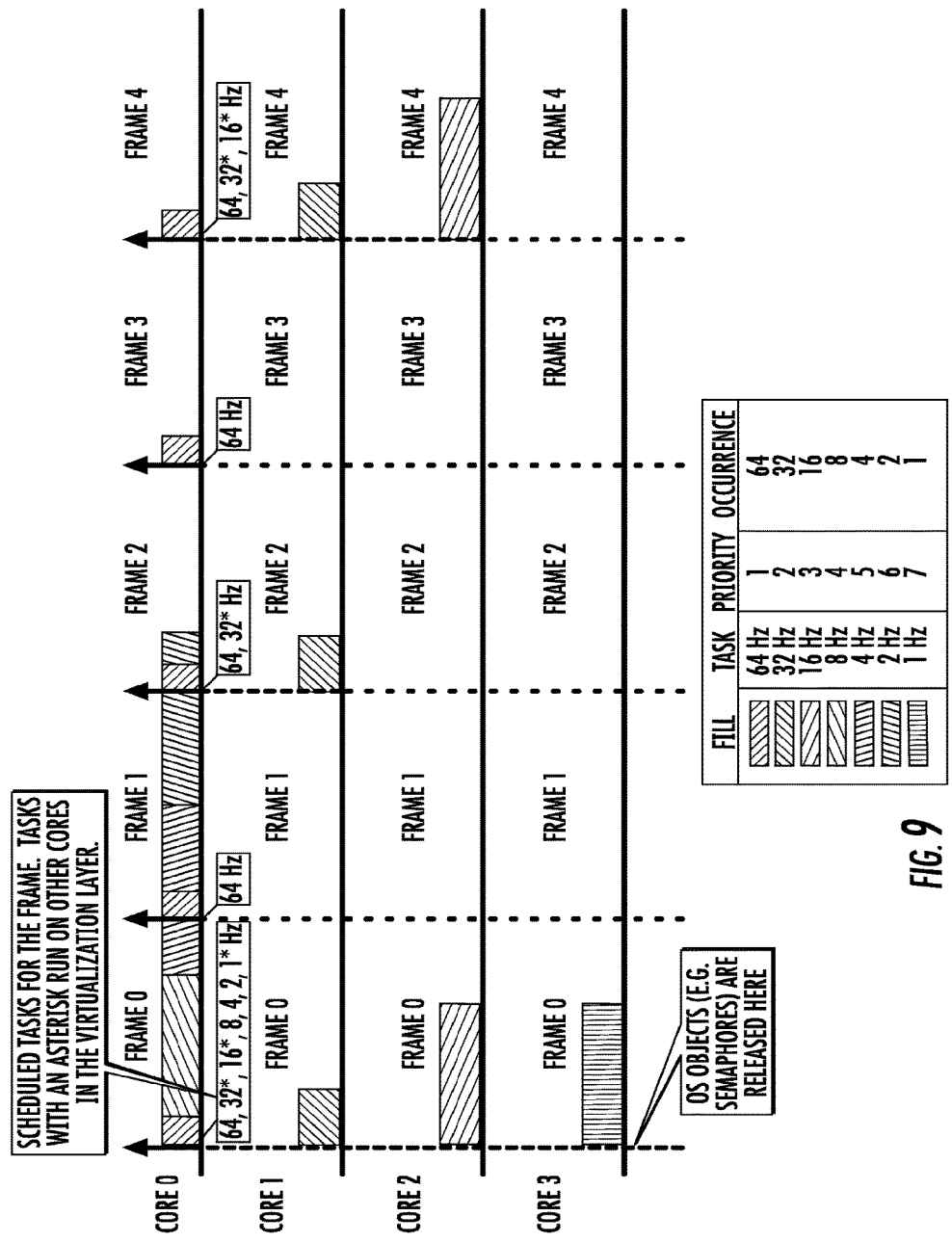
Figure 10:
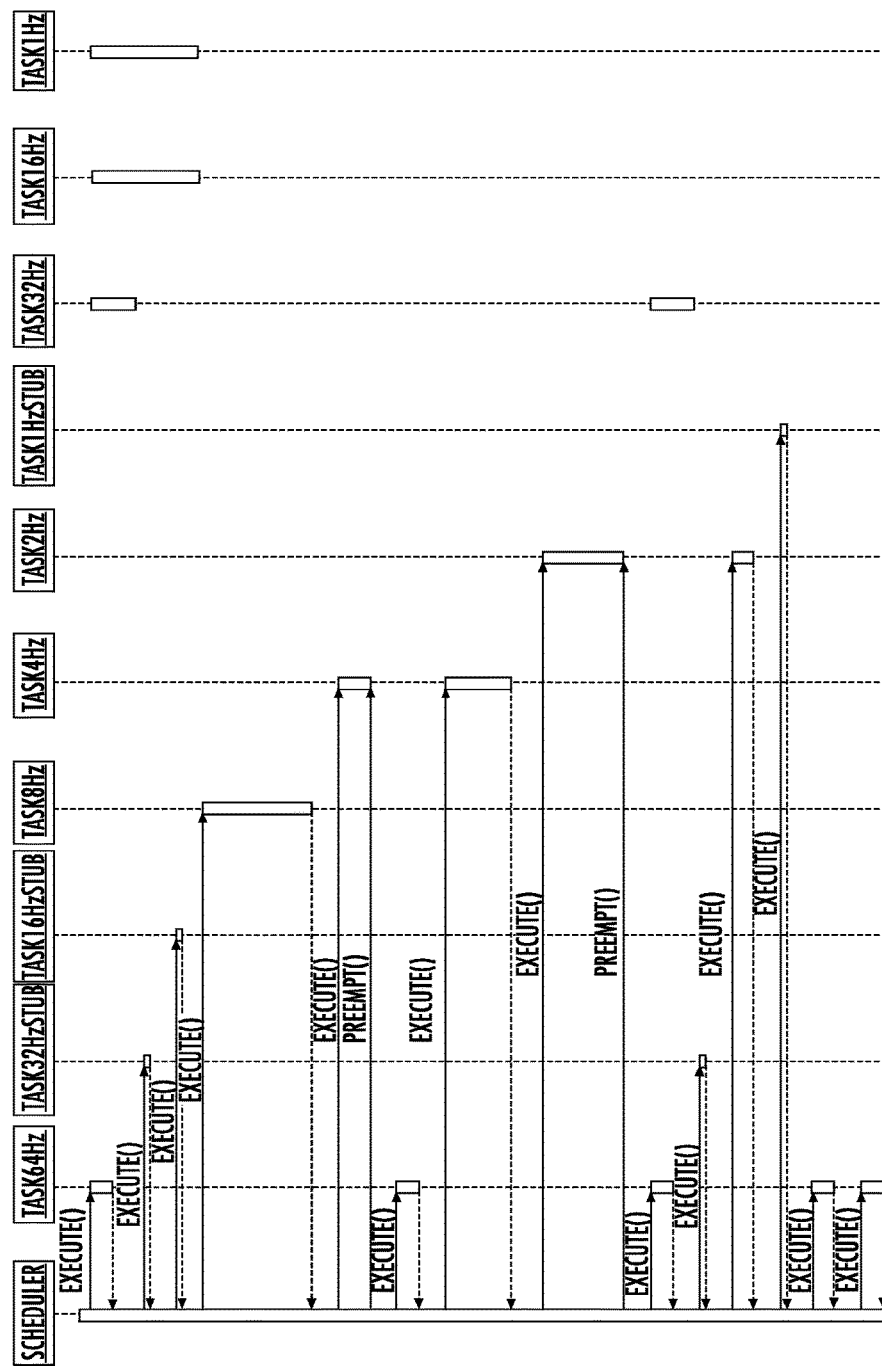
Figure 11:
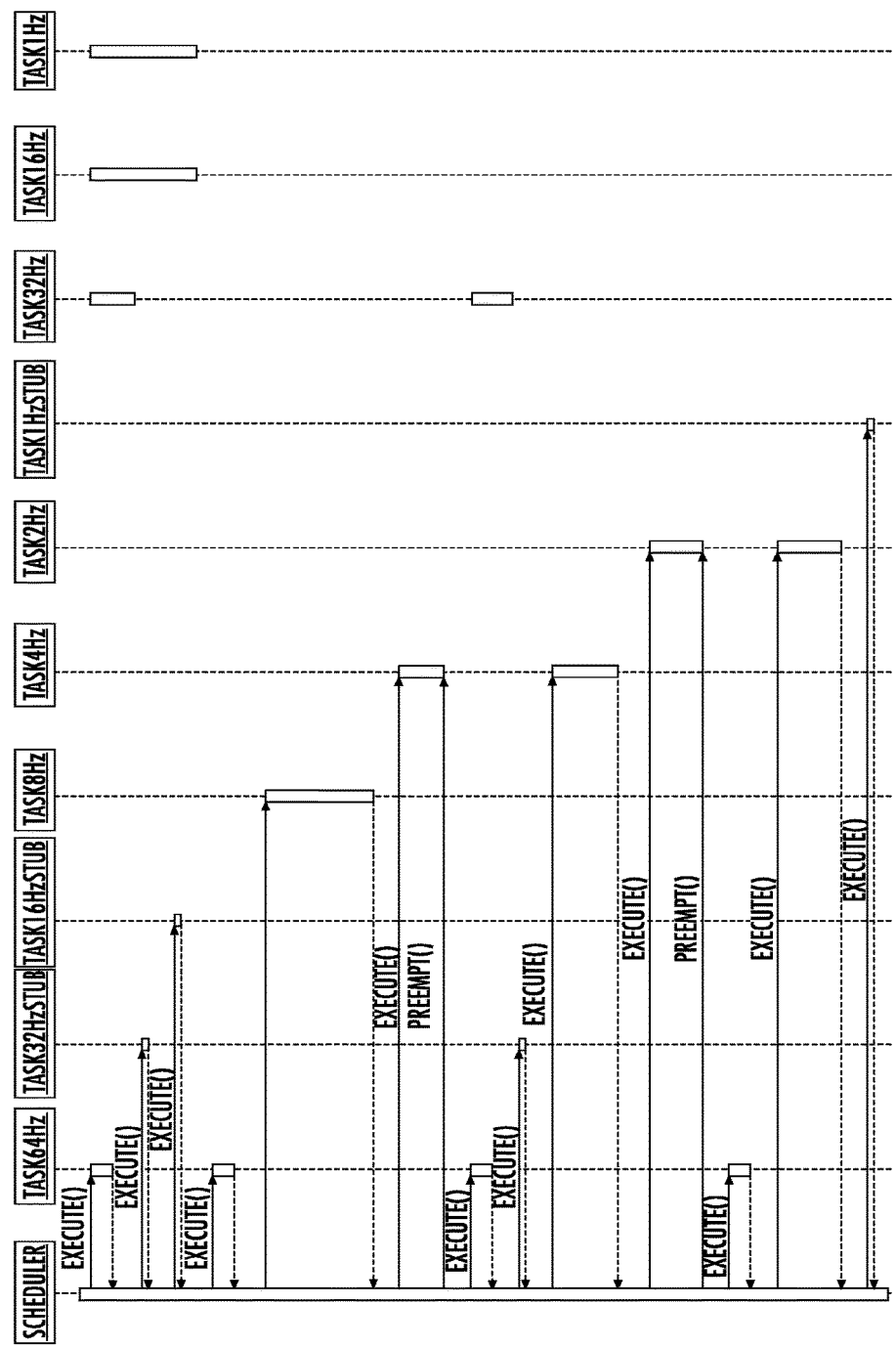

In execution of the tasks other than the identified tasks, the identified tasks may still be encountered, as shown in FIGS. 10 and 11 which are UML sequence diagrams related to FIG. 9. In some examples, when a task that is running in parallel is encountered and scheduled for execution, a method stub may be executed instead. This may occur because the instruction pointer for the task running in parallel may be seen in the virtualization layer 112 before it is executed on a real or emulated processor. If no control functionality is required by the method stub, then the virtual processor 118 may simply return control to the scheduler indicating that the task is complete.

In some examples, OS objects such as semaphores may be left in the tasks that are now executing on additional cores 104*b* of the processor 104 of the host hardware platform 102. These OS objects may guarantee the proper frequency execution of those tasks and can be used unmodified since all tasks executing in the virtualization layer 112 may share the same virtualization platform 116 including memory that may be used to implement the OS objects. It should be understood, though, that other methods of controlling execution of parallel tasks may be used. It should also be noted that OS objects may be intercepted in the virtualization layer and redirected or reinterpreted if necessary to create a functioning system using parallelization in the virtualization layer.

The performance gains of parallelization in the virtualization layer 112 are illustrated in FIG. 9, where it can be seen that all of the tasks that were scheduled in the first frame (frame 0) now complete execution in the third frame (frame 2). This may represent an execution completion performance increase when compared to the normal execution of the computer programs 122 in FIG. 7 where all of the tasks that were scheduled in the first frame did not complete their execution until the sixth frame (frame 5).

In FIG. 10, the execution order of the tasks has changed significantly from FIG. 8. In particular, the preemption of tasks may occur at different points in time than they would otherwise occur in the actual target system. FIG. 11 shows parallelization with preemption occurring in the proper points in apparent time. To accomplish parallelization with proper preemption times may include additional timing analysis of all of the tasks in the system to understand worst case or average execution times to create an appropriate apparent time schedule of tasks. It may also include additional apparent time scheduling computer programs in the virtualization layer 112, with techniques such as freezing virtual processor execution and bounded execution examples of those that may be suitable to accomplish the scheduling.

The tasks running in parallel may not experience preemption in FIG. 11, but once again analysis of the system may be completed to even cause preemption in parallel tasks. This timing analysis for proper preemption in the system may be complex, but may not be of interest in many systems. Proper operation may still be achieved in many cases without preemption being the same as the physical target system. Preemption timing is often not the same on physical target system because there may be timing variations in physical hardware that cause different preemption times with the same computer programs running on different hardware. Computer programs are often tolerant to different preemption times.

Figure 12:
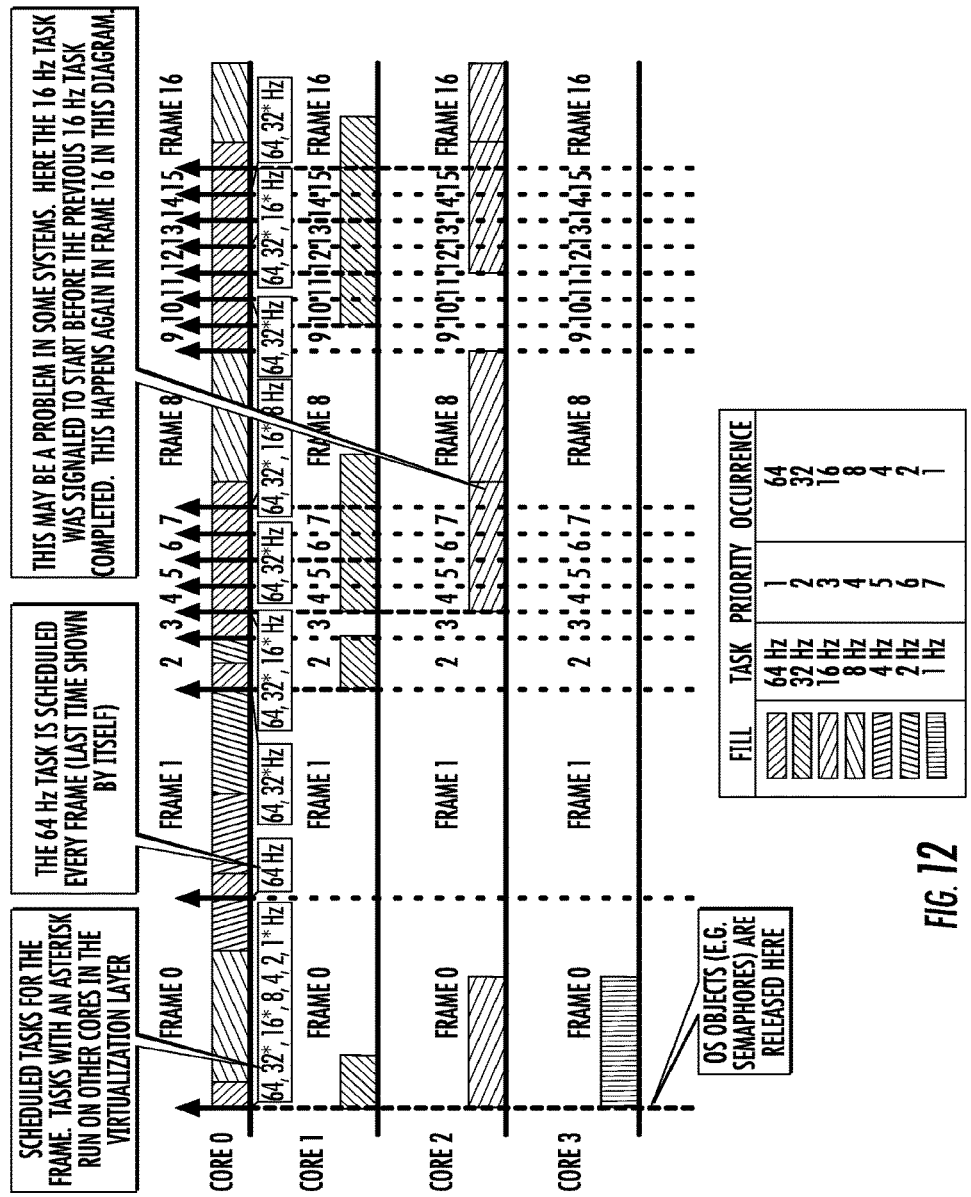
Figure 13:
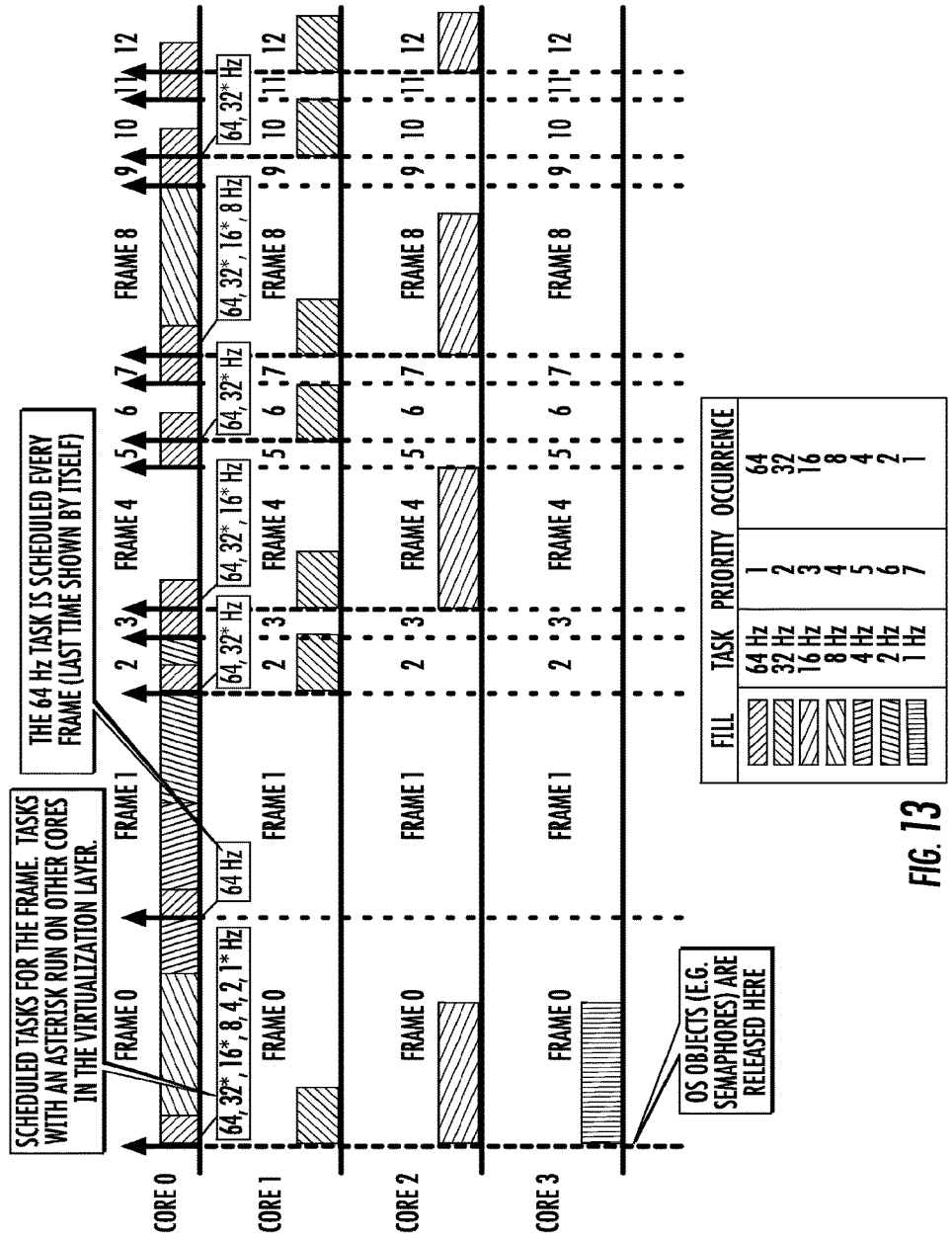
Figure 14:
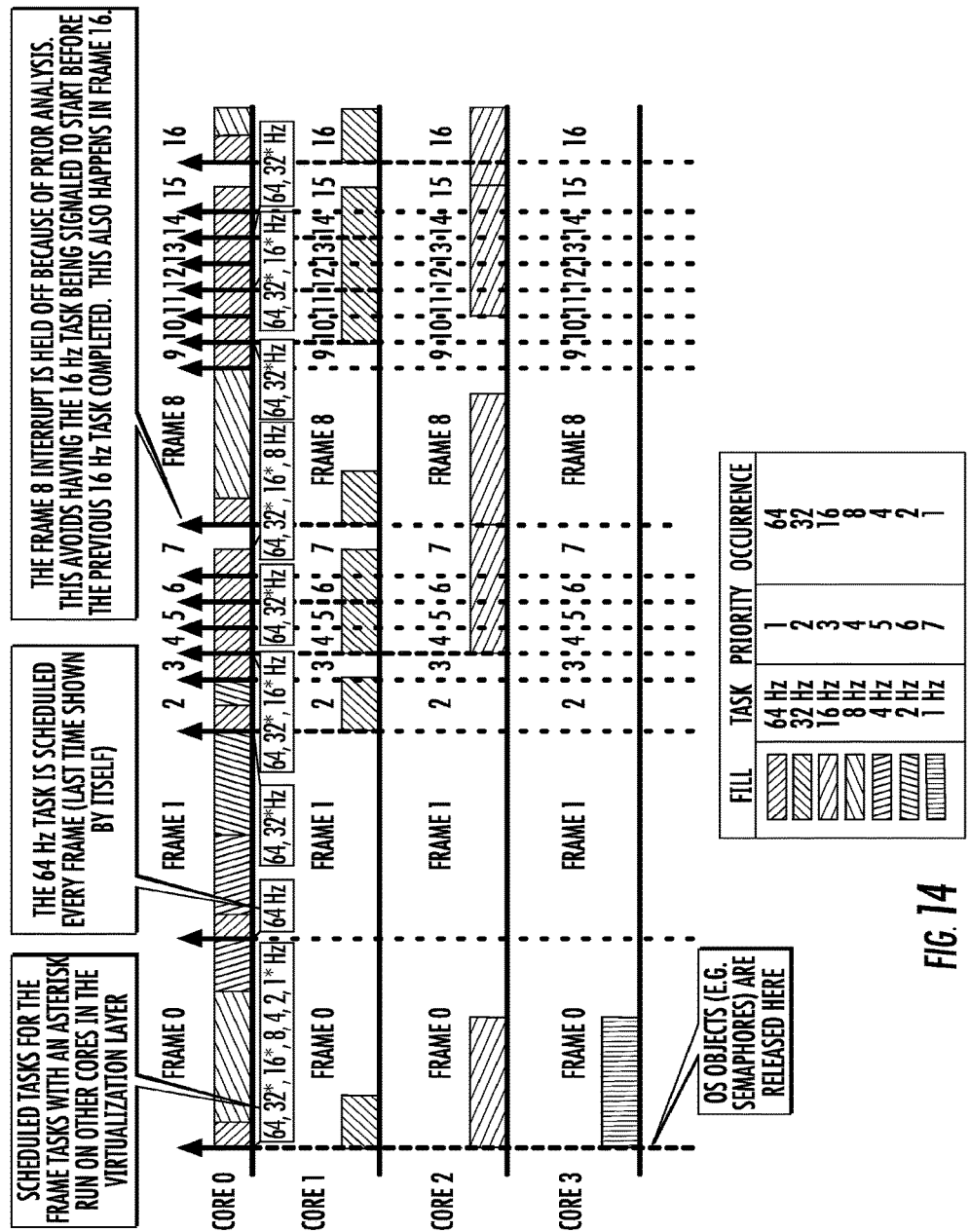

As shown in FIGS. 12-14, in a further aspect of example implementations, task parallelization in the virtualization layer 112 may be performed with a technique to remove idle time from the processing of a virtualized system to even further increase performance gains of the system. This may be particularly the case given that in some instances, the parallelization may increase the amount of removable idle time in the system.

These large performance gains through the combination of the two techniques are illustrated in FIG. 12. When the execution in FIG. 12 is compared to the execution in FIG. 9, it can be seen that almost sixteen frames complete in the same amount of time (e.g., from timer 108) that four frames complete in FIG. 9. This may represent an almost four times performance increase in execution of the computer programs 122 in the VM 114. The selection of tasks for parallelization may have a great effect on how much of a performance increase can be realized with this approach.

In FIG. 12, idle time may be removed on core 0 (e.g., core 104*a*) without regard to how it might impact the execution of the identified tasks running in parallel on the other cores 1, 2, and 3 (additional cores 104*b*). Depending on the nature of the system, ignoring the impact of idle time removal in the core 0 on the now-parallel tasks may present no problems. But as noted in FIG. 12, the removal of idle time on core 0 may cause the Task16 Hz to be scheduled to run in frame 8 before the previous Task16 Hz had completed. The scheduling of Task16 Hz even while the previous Task16 Hz execution is not complete may not pose a problem although it may not execute until the previous execution is complete.

Two example approaches for the removal of idle time are shown in FIGS. 13 and 14. In FIG. 13, one example technique looks at the execution of all cores and waits for every core to enter an idle state after which the apparent time may be advanced to the next frame interrupt to start the next frame. But in some examples, it may no longer be possible to schedule a task to run before the prior same task is complete. This approach may face difficulty in instances in which a task that always runs during idle time, in which case the system may not enter idle time. These instances may be addressed in a number of different manners, though, such as by identifying these tasks and bounding their execution to make sure an idle time state is entered.

In FIG. 14, another example technique for the removal of idle time includes determining if apparent time can be advanced to the next frame start (removing idle time). One example of a suitable approach for this may be to monitor all tasks of interest, particularly the tasks now running in parallel, and make sure the prior task is complete before allowing the start of the next frame. Another example of a suitable approach may be to perform a worst case timing analysis on all tasks, the results of which may be used to add additional scheduling logic to the apparent time advancement. From the timing analysis, it may be possible to identify that Task16 Hz to be scheduled to execute before the previous Task16 Hz has completed in frame 8 and other future frames. Additional logic may be added in the virtualization layer 112 to look for this situation in the execution of the system.

As indicated above, program code instructions may be stored in memory 106 (computer-readable storage medium), and executed by a processor 104, to implement functions of the computer system 100 described herein. As will be appreciated, any suitable program code instructions may be loaded onto the computer system from memory to produce a particular machine, such that the particular machine becomes a means for implementing the functions specified herein. These program code instructions may also be stored in memory that can direct the computer system or processor to function in a particular manner to thereby generate a particular machine or particular article of manufacture. The instructions stored in memory may produce an article of manufacture, where the article of manufacture becomes a means for implementing functions described herein. The program code instructions may be retrieved from memory and loaded into the computer system or processor to configure the computer system or processor to execute operations to be performed on or by the computer system or processor.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer system 100 or processor 104 provide operations for implementing functions described herein.

Execution of instructions by the processor 104, or storage of instructions in memory 106, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer system for providing virtualization services, the computer system comprising one or more central processing units (CPUs), one or more additional CPUs, and a memory storing computer-readable program code portions that, in response to execution by the one or more CPUs and one or more additional CPUs, cause the computer system to at least:

identify one or more computer programs executable as a plurality of tasks, including the computer system being caused to identify a first portion of the plurality of tasks that are executable in parallel, the plurality of tasks also including a remaining portion other than the first portion; and execute the one or more computer programs using one or more virtual CPUs in a virtual machine defined to provide a virtualization platform for virtualization of a target hardware platform, the computer system being caused to execute the one or more computer programs including being caused to at least:

execute the remaining portion of the plurality of tasks by the one or more virtual CPUs in the virtual machine executed on the one or more CPUs of the computer system; and at least partially in parallel therewith, execute the first portion of the plurality of tasks on the one or more additional CPUs of the computer system, wherein the target hardware platform includes one or more CPUs for execution of the plurality of tasks no greater in number than the one or more CPUs of the computer system on which the remaining portion of the plurality of tasks are executed.

2. The computer system of claim 1, wherein the computer system being caused to identify the first portion of the plurality of tasks includes being caused to analyze one or more symbol tables of the one or more computer programs to identify the first portion of the plurality of tasks.

3. The computer system of claim 1, wherein the first portion and the remaining portion of the plurality of tasks include respectively one or more background tasks and one or more foreground tasks, and the computer system being caused to identify the first portion of the plurality of tasks includes being caused to identify the one or more background tasks.

4. The computer system of claim 1, wherein the plurality of tasks are scheduled for execution at respective points in time, the computer system being caused to execute the first portion of the plurality of tasks on the one or more additional CPUs before the respective points in time at which the first portion of the plurality of tasks are scheduled for execution.

5. The computer system of claim 4, wherein the computer system being caused to execute the remaining portion of the plurality of tasks includes being caused to execute a method stub by the one or more virtual CPUs, or immediately move to a next-scheduled task of the plurality of tasks for execution by the one or more virtual CPUs, at each of the respective points in time at which the first portion of the plurality of are scheduled for execution.

6. The computer system of claim 1, wherein the computer system being caused to execute the first portion of the plurality of tasks includes being caused to execute the first portion of the plurality of tasks by one or more additional virtual CPUs in the virtual machine executed on the one or more additional CPUs of the computer system, the one or more additional virtual CPUs being hidden from an operating system configured to manage the virtualization platform.

7. The computer system of claim 1, wherein the plurality of tasks are scheduled for execution at respective points in an apparent time tracked by an apparent-time reference, and wherein during execution of the remaining portion of the plurality of tasks, the computer system is further caused to at least:

detect a current point in apparent time at which all tasks of the remaining portion of the plurality of tasks have been executed, or at which the one or more virtual CPUs are idle; and in response thereto, advance the apparent time from the current point to a subsequent point with a frequency greater than that with which the apparent time is tracked by the apparent-time reference.

8. A method of providing virtualization services, the method comprising:

identifying one or more computer programs executable as a plurality of tasks, identifying the one or more computer programs including identifying a first portion of the plurality of tasks that are executable in parallel, the plurality of tasks also including a remaining portion other than the first portion; and executing the one or more computer programs using one or more virtual central processing units (CPUs) in a virtual machine executed on a host hardware platform and defined to provide a virtualization platform for virtualization of a target hardware platform, executing the one or more computer programs including:

executing the remaining portion of the plurality of tasks by the one or more virtual CPUs in the virtual machine executed on one or more CPUs of the host hardware platform; and at least partially in parallel therewith, executing the first portion of the plurality of tasks on one or more additional CPUs of the host hardware platform, wherein the target hardware platform includes one or more CPUs for execution of the plurality of tasks no greater in number than the one or more CPUs of the host hardware platform on which the remaining portion of the plurality of tasks are executed.

9. The method of claim 8, wherein identifying the first portion of the plurality of tasks includes analyzing one or more symbol tables of the one or more computer programs to identify the first portion of the plurality of tasks.

10. The method of claim 8, wherein the first portion and the remaining portion of the plurality of tasks include respectively one or more background tasks and one or more foreground tasks, and identifying the first portion of the plurality of tasks includes identifying the one or more background tasks.

11. The method of claim 8, wherein the plurality of tasks are scheduled for execution at respective points in time, the first portion of the plurality of tasks being executed on the one or more additional CPUs before the respective points in time at which the first portion of the plurality of tasks are scheduled for execution.

12. The method of claim 11, wherein executing the remaining portion of the plurality of tasks includes executing a method stub by the one or more virtual CPUs, or immediately moving to a next-scheduled task of the plurality of tasks for execution by the one or more virtual CPUs, at each of the respective points in time at which the first portion of the plurality of tasks are scheduled for execution.

13. The method of claim 8, wherein executing the first portion of the plurality of tasks includes executing the first portion of the plurality of tasks by one or more additional virtual CPUs in the virtual machine executed on the one or more additional CPUs of the host hardware platform, the one or more additional virtual CPUs being hidden from an operating system configured to manage the virtualization platform.

14. The method of claim 8, wherein the plurality of tasks are scheduled for execution at respective points in an apparent time tracked by an apparent-time reference, and wherein during execution of the remaining portion of the plurality of tasks, the method further comprises:

detecting a current point in apparent time at which all tasks of the remaining portion of the plurality of tasks have been executed, or at which the one or more virtual CPUs are idle; and in response thereto, advancing the apparent time from the current point to a subsequent point with a frequency greater than that with which the apparent time is tracked by the apparent-time reference.

15. A computer-readable storage medium for providing virtualization services, the computer-readable storage medium being non-transitory and having computer-readable program code portions stored therein that, in response to execution by one or more central processing units (CPUs) and one or more additional CPUs, cause a computer system to at least:

identify one or more computer programs executable as a plurality of tasks, including the computer system being caused to identify a first portion of the plurality of tasks that are executable in parallel, the plurality of tasks also including a remaining portion other than the identified first portion; and execute the one or more computer programs using one or more virtual CPUs in a virtual machine defined to provide a virtualization platform for virtualization of a target hardware platform, the computer system being caused to execute the one or more computer programs including being caused to at least:

execute the remaining portion of the plurality of tasks by the one or more virtual CPUs in the virtual machine executed on the one or more CPUs of the computer system; and at least partially in parallel therewith, execute the first portion of the plurality of tasks on the one or more additional CPUs of the computer system, wherein the target hardware platform includes one or more CPUs for execution of the plurality of tasks no greater in number than the one or more CPUs of the computer system on which the remaining portion of the plurality of tasks are executed.

16. The computer-readable storage medium of claim 15, wherein the computer system being caused to identify the first portion of the plurality of tasks includes being caused to analyze one or more symbol tables of the one or more computer programs to identify the first portion of the plurality of tasks.

17. The computer-readable storage medium of claim 15, wherein the first portion and the remaining portion of the plurality of tasks include respectively one or more foreground tasks and one or more background tasks, and the computer system being caused to identify the first portion of the plurality of tasks includes being caused to identify the one or more background tasks.

18. The computer-readable storage medium of claim 15, wherein the plurality of tasks are scheduled for execution at respective points in time, the computer system being caused to execute the first portion of the plurality of tasks on the one or more additional CPUs before the respective points in time at which the first portion of the plurality of tasks are scheduled for execution.

19. The computer-readable storage medium of claim 18, wherein the computer system being caused to execute the remaining portion of the plurality of tasks includes being caused to execute a method stub by the one or more virtual CPUs, or immediately move to a next-scheduled task of the plurality of tasks for execution by the one or more virtual CPUs, at each of the respective points in time at which the first portion of the plurality of tasks are scheduled for execution.

20. The computer-readable storage medium of claim 15, wherein the computer system being caused to execute the first portion of the plurality of tasks includes being caused to execute the first portion of the plurality of tasks by one or more additional virtual CPUs in the virtual machine executed on the one or more additional CPUs of the computer system, the one or more additional virtual CPUs being hidden from an operating system configured to manage the virtualization platform.

21. The computer-readable storage medium of claim 15, wherein the plurality of tasks are scheduled for execution at respective points in an apparent time tracked by an apparent-time reference, and wherein during execution of the remaining portion of the plurality of tasks, the computer system is further caused to at least:
  detect a current point in apparent time at which all tasks of the remaining portion of the plurality of tasks have been executed, or at which the one or more virtual CPUs are idle; and in response thereto,
  advance the apparent time from the current point to a subsequent point with a frequency greater than that with which the apparent time is tracked by the apparent-time reference.

\* \* \* \* \*